US012622420B2

(12) United States Patent
Smith

(10) Patent No.: US 12,622,420 B2
(45) Date of Patent: May 12, 2026

(54) FISHING LURE

(71) Applicant: Fishing2TheMax, LLC, Madison, WI (US)

(72) Inventor: Maxwell S. Smith, Madison, WI (US)

(73) Assignee: Fishing2TheMax, LLC, Madison, WI (US)

( * ) Notice: Subject to any disclaimer, the term of this patent is extended or adjusted under 35 U.S.C. 154(b) by 0 days.

(21) Appl. No.: 18/087,368

(22) Filed: Dec. 22, 2022

(65) Prior Publication Data

US 2024/0206445 A1     Jun. 27, 2024

(51) Int. Cl.
A01K 85/02        (2006.01)
A01K 85/00        (2006.01)

(52) U.S. Cl.
CPC .......... A01K 85/023 (2022.02); A01K 85/021 (2022.02); A01K 85/1851 (2022.02)

(58) Field of Classification Search
CPC ................ A01K 85/023; A01K 85/021; A01K 85/1851; A01K 85/16; A01K 85/18; A01K 85/024
See application file for complete search history.

(56) References Cited

U.S. PATENT DOCUMENTS

| | | | | | |
|---|---|---|---|---|---|
| 1,689,541 | A | * | 10/1928 | Welch | A01K 85/16 |
| | | | | | 43/42.3 |
| 1,888,221 | A | * | 11/1932 | Coffin | A01K 85/16 |
| | | | | | 43/42.42 |
| 2,089,605 | A | * | 8/1937 | Hardy | A01K 85/16 |
| | | | | | 43/42.26 |
| 2,217,677 | A | * | 10/1940 | Achilles | A01K 85/18 |
| | | | | | 43/42.34 |
| 2,221,381 | A | * | 11/1940 | Hosmer | A01K 85/18 |
| | | | | | 43/42.43 |
| 2,419,037 | A | * | 4/1947 | Safford | A01K 85/16 |
| | | | | | D22/128 |
| 2,521,555 | A | * | 9/1950 | Widmer | A01K 85/02 |
| | | | | | 43/42.36 |
| 2,724,205 | A | * | 11/1955 | Howard | A01K 85/16 |
| | | | | | 43/42.3 |
| 2,770,063 | A | * | 11/1956 | Martin | A01K 85/16 |
| | | | | | 43/42.26 |
| 3,376,663 | A | * | 4/1968 | Amrine | A01K 85/16 |
| | | | | | 43/42.3 |
| 4,208,822 | A | * | 6/1980 | Bryant | A01K 85/01 |
| | | | | | 43/42.31 |
| 4,567,685 | A | | 2/1986 | Duncan | |
| 5,009,024 | A | | 4/1991 | Parman | |
| 6,546,663 | B1 | * | 4/2003 | Signitzer | A01K 85/00 |
| | | | | | 43/4.5 |
| 8,156,682 | B2 | | 4/2012 | Dahlberg | |
| 8,793,924 | B2 | * | 8/2014 | Hughes | A01K 85/18 |
| | | | | | 43/42.26 |

(Continued)

*Primary Examiner* — Marisa V Conlon

(57)          ABSTRACT

A lure is disclosed. The lure comprises a head, a tail, a first channel extending inside the head to the tail, a pair of hind legs extending from the tail and including a first leg having a first foot, a second leg having a second foot, the first foot being connected to the second foot forming a foot body having a second channel. The lure has a line having a first end and a second end, and the second end is provided through the first channel and the second channel. The second end is connected to the foot body. The lure may resemble a frog, insect, or amphibian.

20 Claims, 14 Drawing Sheets

(56)              References Cited

U.S. PATENT DOCUMENTS

| | | | | |
|---|---|---|---|---|
| 9,149,028 | B2 * | 10/2015 | Wilson | A01K 85/00 |
| 9,439,407 | B2 * | 9/2016 | Signitzer | A01K 85/01 |
| 2005/0172538 | A1 * | 8/2005 | Brinkman | A01K 85/00 |
| | | | | 43/42.36 |
| 2012/0005944 | A1 | 1/2012 | Carswell et al. | |
| 2022/0053745 | A1 * | 2/2022 | DeHerrera | A01K 85/00 |

* cited by examiner

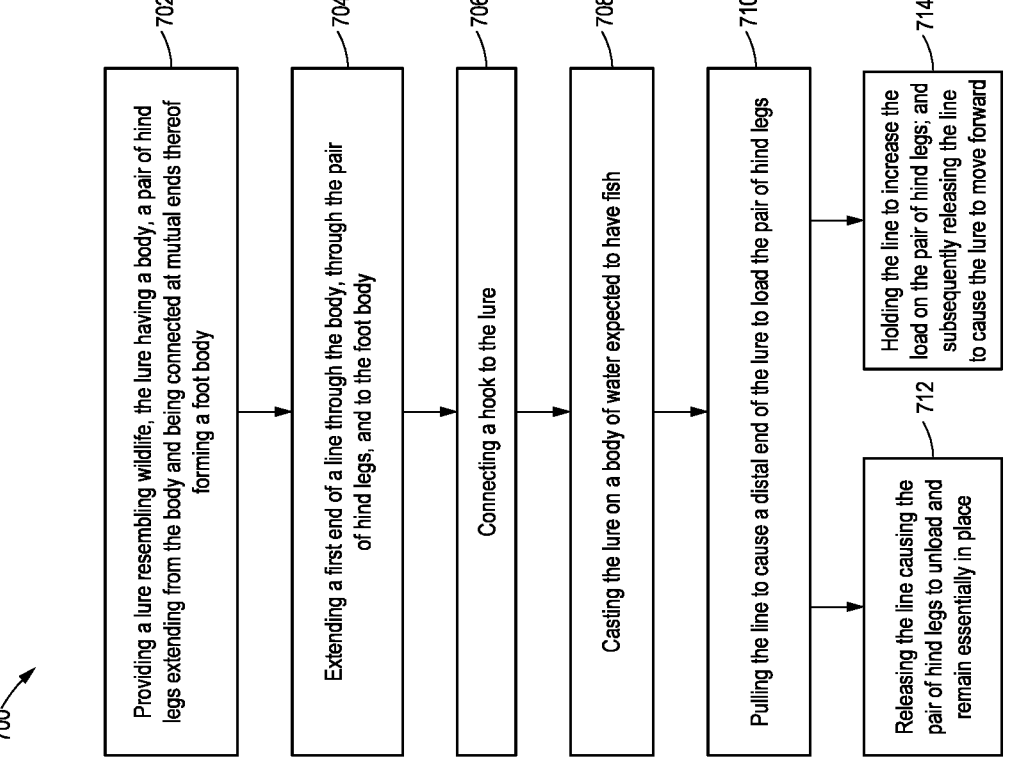

Providing a lure resembling wildlife, the lure having a body, a pair of hind legs extending from the body and being connected at mutual ends thereof forming a foot body — 702

Extending a first end of a line through the body, through the pair of hind legs, and to the foot body — 704

Connecting a hook to the lure — 706

Casting the lure on a body of water expected to have fish — 708

Pulling the line to cause a distal end of the lure to load the pair of hind legs — 710

Releasing the line causing the pair of hind legs to unload and remain essentially in place — 712

Holding the line to increase the load on the pair of hind legs; and subsequently releasing the line to cause the lure to move forward — 714

FISHING LURE

TECHNICAL FIELD

The present disclosure generally relates to fishing, and more particularly relates to fishing lures.

BACKGROUND

Fishing has been an important part of human culture since hunter-gatherer times, and is one of the few food production activities that has existed from prehistory into today's modern age. In addition to being caught to be eaten for food, fishing is a popular recreational pastime. There are many fishing techniques and tactics for catching fish. Recreational and commercial fisherman may use similar fishing techniques and equipment.

Fishing tackle is the equipment used by fishers when fishing and may include items such as hooks, lines, sinkers, floats, rods, reels, baits, lures, spears, nets, gaffs, traps, waders, and tackle boxes. A fishing lure is a broad type of tackle in the form of artificial fishing bait designed to mimic prey animal and attract the attention of fish. The lure may use many features to attract the fish such as using appearances, movements, vibrations, bright reflections, and flashy colors to appeal to the fish's predatory instinct and entice it into striking the bait. Lures are designed to fool carnivorous fish and elicit an aggressive strike, the force of which will alert the angler (fisherman) to yank the line to secure a hookset inside the mouth of a fish. Why a fish bites a baited hook or lure involves several factors related to the sensory physiology, behavior, feeding ecology, and biology of the fish as well as the environment and characteristics of the bait, hook, or lure.

Lures are attached to the end of a fishing line and most are equipped with one or more hooks that come in various styles such as single, double, or treble hooks. Lures may be made of plastic or rubber designed to look like fish, crabs, squid, worms, lizards, frogs, leeches, and other creatures.

Frog lures are designed to mimic the color and action of an actual frog. There are many different types of frog lures on the market used for fishing, such as topwater frog lures. Many frog lures are generally provided with two upswept hooks around a soft body with two legs that dangle. The frog lures are usually pulled from the head of the frog. Frog lures may have either tassel or realistic legs and slide over the surface of water, lily pads, or weeds without getting stuck when pulled by a line from the head of the frog lure. Frog lures are buoyant and may be hollow to help with sliding on water. Using frog lures creates disturbance and stillness on the surface of water to look natural and attract a fish, such as a lurking bass that preys on frogs.

Others have attempted to design frog shaped fishing lures. For example, U.S. Pat. No. 8,156,682 discloses a frog lure device. The lure has a diving "collar" disposed around an upper region of the lure body which causes the lure body to dive. When given a single pull followed by a rest, the frog lure responds by diving from a surface region of the water to a depth beneath the surface region, causing the resistance of the water to straighten the legs of the lure as it moves forward. When pulled, the lure is pulled from the head of the frog lure device.

It can therefore be seen that a need exists for a fishing lure that floats and more accurately mimics the movement of an actual frog as that entices fish to bite, get hooked, and ultimately be caught.

SUMMARY OF THE DISCLOSURE

In accordance with one aspect of the disclosure, a lure is disclosed. The lure comprises a head, a tail, a first channel extending inside the head to the tail, a pair of hind legs extending from the tail and including a first leg having a first foot, a second leg having a second foot, the first foot being connected to the second foot forming a foot body having a second channel. The lure has a line having a first end and a second end, and the second end is provided through the first channel and the second channel. The second end is connected to the foot body.

In accordance with another aspect of the disclosure, a line-thru lure is disclosed. The line-thru lure comprises a head, a tail, a hook, a first channel extending inside the head to the tail, a pair of hind legs extending from the tail and including a first leg having a first foot, a second leg having a second foot, the first foot being connected to the second foot forming a foot body having a second channel.

In accordance with another aspect of the disclosure, a method of catching fish is disclosed. The method comprises: providing a lure resembling wildlife, the lure having a body, a pair of hind legs extending from the body and being connected at mutual ends thereof forming a foot body: extending a first end of a line through the body, through the pair of hind legs, and to the foot body: connecting a hook to the lure: casting the lure to float on a body of water expected to have fish; tugging the line to cause the distal end of the lure to bend the pair of hind legs and move the foot body towards the body: and untugging the line causing the pair of hind legs to exert a force against the body of water thereby pushing the lure forward.

These and other aspects and features of the present disclosure will be better understood upon reading the following detailed description when read in conjunction with the accompanying drawings.

BRIEF DESCRIPTION OF THE DRAWINGS

FIG. 13 is a flow-chart of a method of using a fishing lure to mimic a frog or insect, according to an embodiment of the present disclosure.

DETAILED DESCRIPTION

Figure 1:
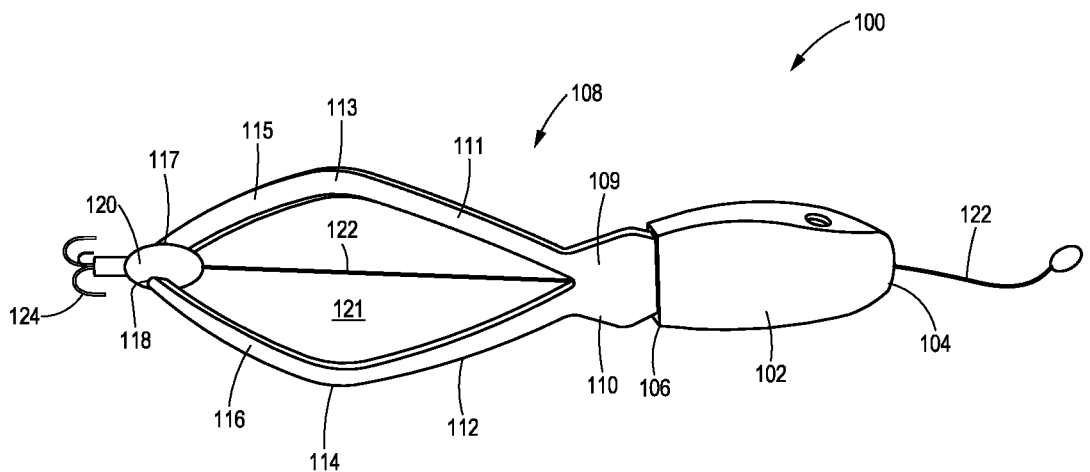
FIG. 1 is a perspective view of a line-thru fishing lure, according to an embodiment of the present disclosure.

Referring now to the drawings, and with specific reference to FIG. 1, a fishing lure constructed in accordance with the teachings of this disclosure is generally referred to by reference numeral 100. One will recognize that the lure 100 may also be shaped as an insect, amphibian, or other bait having hind legs. The lure 100 comprises a body 102, with the body 102 having a head 104 and a tail 106. The tail 106 is connected to a pair of legs 108 that extends from the tail 106. The pair of legs 108 may resemble a pair of hind legs as generally known on the anatomy of frogs, grasshoppers, insects, or other amphibians and are used to resemble fish bait.

Figure 2:
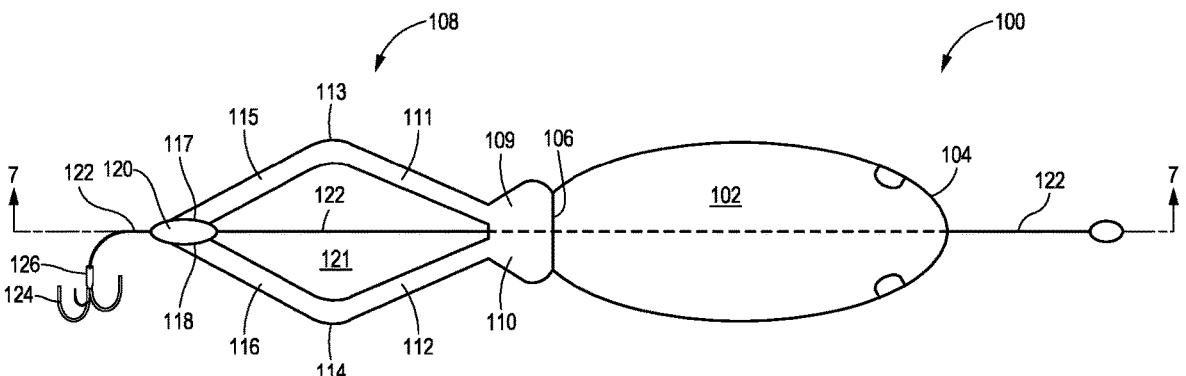
FIG. 2 is a top plan view of a fishing lure with legs extended, according to an embodiment of the present disclosure.

As shown best in FIG. 2, the pair of legs 108 comprises a first leg 109 and a second leg 110. The first leg 109 has a first thigh 111, a first knee 113, a first shin 115, and a first foot 117. The second leg 110 has a second thigh 112, a second knee 114, a second shin 116, and a second foot 118. The first leg 109 is bent at the first knee 113. The second leg 110 is also bent at the second knee 114 in an opposite direction of the first leg 109. The first foot 117 connects to the second foot 118 reconnecting the first leg 109 to the second leg 110 forming a foot body 120. The first leg 109 and the second leg 110 form a space 121 between the first knee 113 and the second knee 114.

As opposed to known frog lures, a line 122 is extended through the head 104 of the body 102 through the tail 106 and between the pair of legs 108. More specifically, the line 122 also extends through the space 121 between the first knee 113 and second knee 114, through the foot body 120, and ultimately connected to a hook 124. One may recognize that the line 122 may ultimately connect to the foot body 120 in other embodiments.

The line 122 may be made of metal wire, titanium wire, PE (polyethylene) line, fluorocarbon line, monofilament line, assist PE line, assist PE hollow line, or PE line with metal wire integrated wholly or partially, or the like. Assist line is a cord used for making assist rigs, attaching to assist-hooks for popping and jigging, as generally known in fishing. Assist cord is super strong cord, highly abrasion resistant, and designed for big game fishing, such as Giant Trevally and Tuna, and toothy fish. Assist cords provide moderate elasticity and tension, reduces line trouble, and provides adequate stiffness for improved hook-ups to fish.

Assist cord may be made of material such as nylon, copolymer nylon, Kevlar, or plastic fibers.

The hook 124 may be any type of known fishing hook such as a j-hook, a single hook, a double hook, a treble hook, or assist hook that is made of metal or other material generally known in the arts of fishing. The hook 124 may be connected to the line 122 directly, via additional PE assist line, rope, or the like. Metal wire, such as titanium wire, or the like, may be threaded in the line 122 with PE assist line. The metal wire may be the whole length of the PE assist line or extend only partially along the length of the PE assist line. Providing a metal wire partially allows for only part of the line 122 to be stiff but still helps prevent tangles. Having a partially stiff line allows for additional movement of the line 122 for an increased chance of hooking a fish during a bite. An assist hook is a j-hook that is rigged with strong utility cord, fiber cord, Dyneema®, Kevlar® cord, or the like, secured to the hook and offers a loop of easy attachment to a lure or ring. Some assist hooks are made with wire or cable. Fish cannot use leverage to throw the assist hook like they can with a treble hook rigged on a lure. A flexible assist cord eliminates the possibility and the j-hook provides a solid and secure hookset. Shrink wrap may be used around a shank portion 126 of the hook 124 connected to the line 122 for a more secure connection of the hook 124 to the line 122. The shrink wrap may be heated to melt around the line 122 and the shank portion 126 of the hook 124. The shrink wrap is easily removable and replaceable for when a new hook is needed to be replaced. This allows the lure 100 to have a longer use life with the ability to replace connections of the hook 124 to the line 122.

The body 102 may be made of plastic or other buoyant material. The pair of legs 108 may also be made of plastic, rubber, plastisol, shape-memory polymer, resin, thermoplastic elastomer, or other buoyant material generally known in the arts and capable of floating on water. The body 102 may also be hollow and formed to resemble various species of fish bait such as frogs, insects, or amphibians that have hind legs. The pair of legs 108 may be made of plastic or rubber that reverts to the original shape if the pair of legs 108 are bent.

Figure 3:
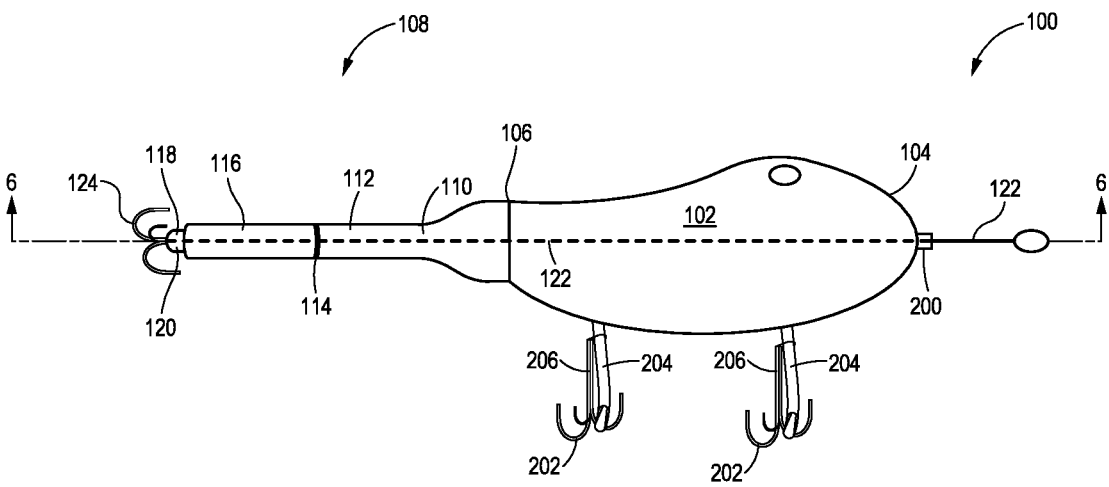
FIG. 3 is a side view of the lure of FIG. 2 with legs extended, according to an embodiment of the present disclosure.

Now referring to FIG. 3, a side view of the lure 100 is depicted with the pair of legs 108 fully extended. The line 122 is shown provided within a first channel 200 extended inside the body 102. The body 102 may further comprise a belly hook 202 on the underside of the body 102. The belly hook 202 may also be a single, double, or a treble hook as with hook 124 mentioned above, and as generally known in fishing. There may be more than one belly hook 202 connected to the body 102. The belly hook 126 may be connected to the body 102 via a cord 204. The cord 204 may be made of fiber, nylon, utility cord, assist line, or PE assist line. PE assist line helps provide stiffness to avoid tangling but is limber enough for movement when a fish is hooked. The belly hook 202 may be connected to the cord 204 directly, via additional PE assist line, rope, or the like. Metal wire, such as titanium wire, or the like, may be threaded in the cord 204 with PE assist line. The metal wire may be the whole length of the PE assist line or extend only partially along the length of the PE assist line. Providing a metal wire partially allows for only part of the cord 204 to be stiff and prevent tangles when more than one belly hook 202 and cord 204 are provided on the lure 100. Having a partially stiff line allows for additional movement of the cord 204 for an increased chance of hooking a fish during a bite. Shrink wrap may also be used around a b-shank portion 206 of the belly hook 202 and heated to melt around the cord 204 and the b-shank portion 206 of the belly hook 202. The shrink wrap is easily removable and replaceable for when a new belly hook is needed to be replaced on the underside of the body 102. This allows the lure 100 to have a longer use life with the ability to replace connections of the belly hook 202 to the cord 204 and the body 102.

Figure 4:
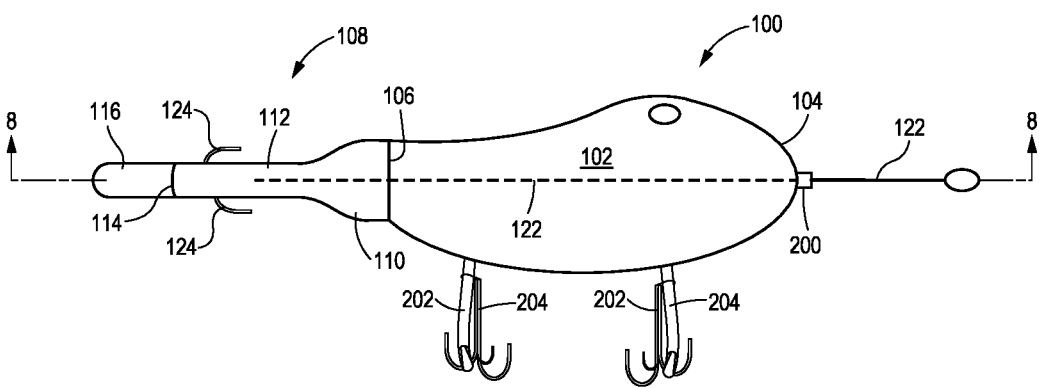
FIG. 4 is a side view of the lure of FIG. 2 but illustrated to show the fishing lure when the lure line is pulled and legs retracted, according to an embodiment of the present disclosure.
Figure 5:
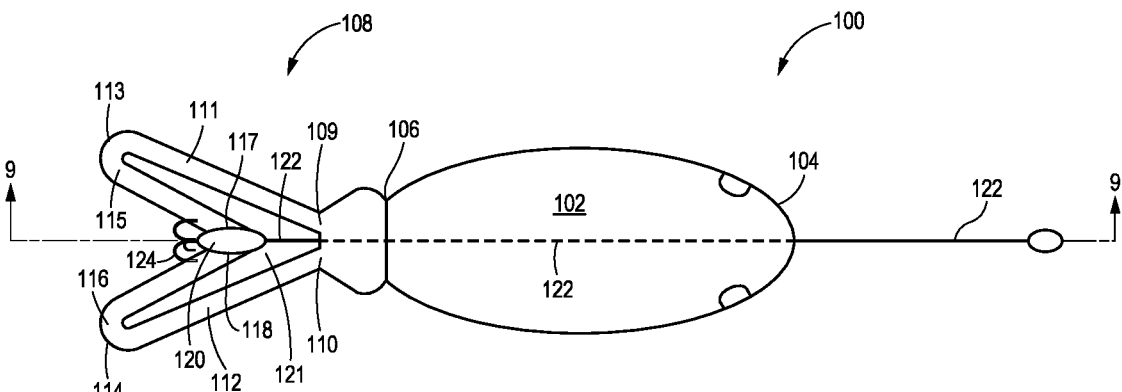
FIG. 5 is a top plan view of the lure of FIG. 4, according to an embodiment of the present disclosure.

Now referring to FIGS. 4-5, the lure 100 is shown with the line 122 pulled so that the pair of legs 108 are bent at the first knee 113 and second knee 114. When the line 122 is pulled, the hook 124 is pulled into the foot body 120 which is thereby pulled towards the tail 106. The hook 124 causes the foot body 120 to move towards the tail 106 when the line 122 is pulled. When the line 122 is released, the foot body 120 moves away from the tail 106 because the pair of legs 108 revert to their original extended position due to being made of plastic, rubber, plastisol, shape-memory polymer, resin, thermoplastic elastomer, or other shape-memory material generally known in the arts.

Now referring to FIGS. 6-9, cross-sections of the lure 100 are illustrated showing the first channel 200 in the body 102 extending from the head 104 to the tail 106 and connected to the pair of legs 108. A second channel 300 is extended within the foot body 120, and may extend out of the foot body 120. The line 122 extends through the entire lure 100 within the first channel 200 and the second channel 300. The lure 100 may float on top of water because the lure 100 is hollow and/or made of buoyant material.

The first channel 200 and second channel 300 may be hollow tubes made of plastic, metal, or other material that allows the line 122 to move within. The line 122 is provided, first, through the first channel 200 in the body 102, then through the second channel 300 in the foot body 120, and ultimately connected to the hook 124. The first channel 200 and the second channel 300 assist in providing back-and-forth free motion of the line 122 when the line 122 is pulled, tugged, and released. When the lure 100 moves, it creates disturbances and stillness on the surface of water similar to an actual frog on the surface of water, weeds, and/or lily pads. The natural-like movement and jumping attracts a fish, such as a lurking bass that preys on frogs, to bite the lure 100 and get hooked to the hook 124 or belly hook 202. The lure 100 may float on top of water because the lure 100 is hollow and/or made of buoyant material.

Figure 6:
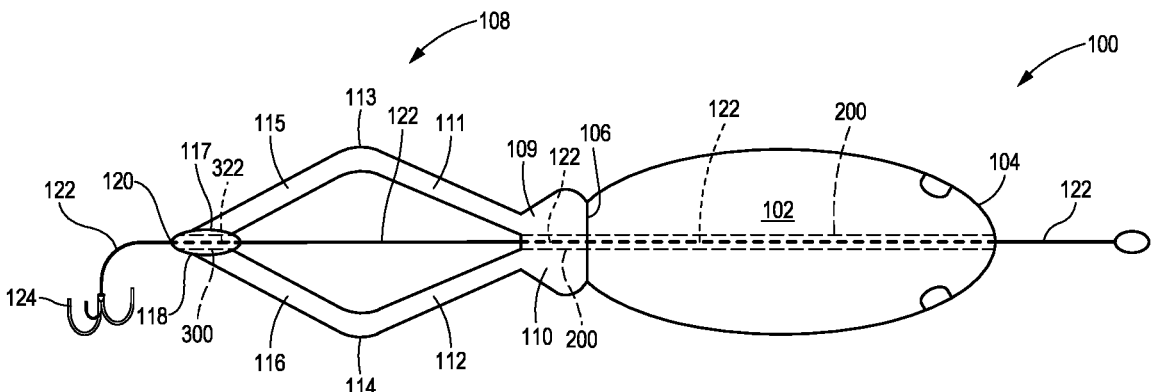
FIG. 6 is a cross-sectional view of the fishing lure of FIG. 2, taken along line 6-6 of FIG. 3, according to an embodiment of the present disclosure.

The hook 124 is configured to fit into the second channel 300. This allows the hook 124 to be hidden in position and become dislodged once a fish is hooked. The lure 100 allows the hook 124 to be separated from the lure 100 when a fish is hooked and give the fisherman an improved chance to hook the fish and less of a chance that the fish becomes unhooked. The lure 100 is capable of sliding up the line 122 and away from the hook 124. The second channel 300 acts as a hiding spot for the hook 124 to be tucked away by entering the second channel 300, partially or entirely. As shown in FIG. 6, when the line 122 is released the hook 124 may be released from the foot body 120 and lowered into the water and away from the foot body 120.

Figure 8:
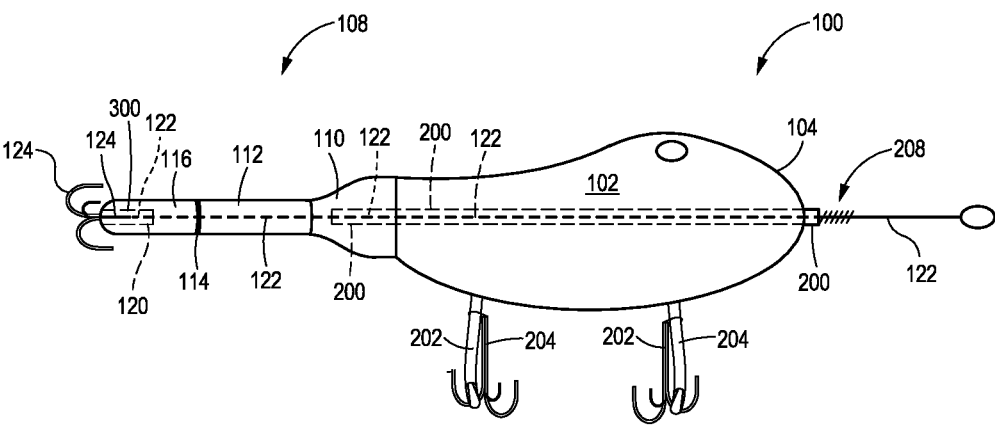
FIG. 8 is a cross-sectional view of the fishing lure of FIG. 2, taken along line 8-8 of FIG. 4, according to an embodiment of the present disclosure.
Figure 9:
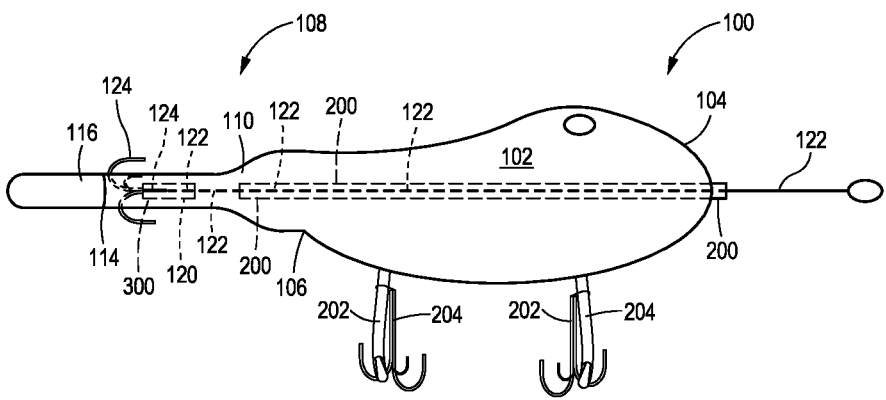
FIG. 9 is a cross-sectional view of the fishing lure of FIG. 2, taken along line 9-9 of FIG. 5, according to an embodiment of the present disclosure.

As shown in FIGS. 8 and 9, the foot body 120 moves towards the tail 106 when the line 122 is pulled or tugged, and the hook 124 is tucked away within the foot body 120. The line 122 is connected to the hook 124 so that the hook 124 may enter the second channel 300 and pull the foot body 120 forward. A portion of the hook 124 may wrap around the exterior of the foot body 120 when pulled by the line 122 thereby pulling the foot body 120 forward. The second channel 300 may extend out of the foot body 120 so as to provide a clearance between the hook 124 and the foot body 120 to prevent the sharp portions of the hook 124 from getting caught or hooked on the foot body 120.

The pair of legs 108 are made of a malleable material such as plastic, rubber, or shape-memory polymer so that the first leg 109 and the second leg 110 revert to or retains its original positions. The pair of legs 108 may be formed by injection molding or other method generally known in the arts that produces plastic, resin, or rubber bodies. When the line 122 is pulled or tugged the pair of legs 108 may change states from a "loaded" and "unloaded" state to facilitate mimicking movements of a fish bait. When the line 122 is pulled the pair of legs 108 will enter the loaded state and bend, similar to hind legs, as shown in FIGS. 4, 5, 7 and 9. Once the line 122 is released or untugged it will cause the pair of legs 108 to revert to its extended position, the unloaded state. The pair of legs 108 will revert to retaining their unloaded state, the original extended positions, as shown in FIGS. 1, 2, 3, 6, and 8, when the line 122 is released. When the pair of legs 108 enter a loaded state, the bent pair of legs 108 have a potential of energy to cause the lure 100 to move forward. Shape-memory material, or the like, may provide the pair of legs 108 with elastic energy in a loaded state to facilitate movement of the lure 100. The lure 100 generally does not have energy to move while in an unloaded state.

Figure 7:
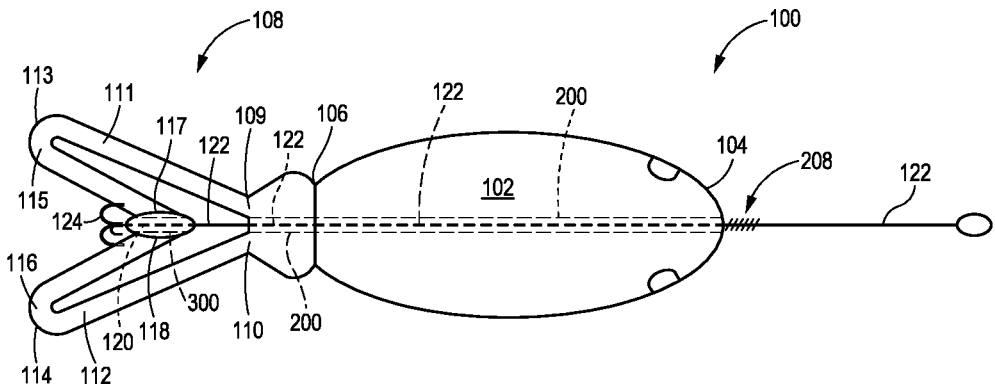
FIG. 7 is a cross-sectional view of the fishing lure of FIG. 2, taken along line 7-7 of FIG. 2, according to an embodiment of the present disclosure.

To further mimic bait, the line 122 may comprise a tongue 208 which may be a portion of the line 122 proximate the head 104 colored red, or another color that entices fish, as shown in FIGS. 7-8. The tongue 208 mimic a frog or bait's tongue moving in and out of a its mouth when pulling and releasing the line 122 from a loaded and unloaded state. The tongue 208 may further entice a fish into biting the lure 100 and getting hooked.

Figure 10:
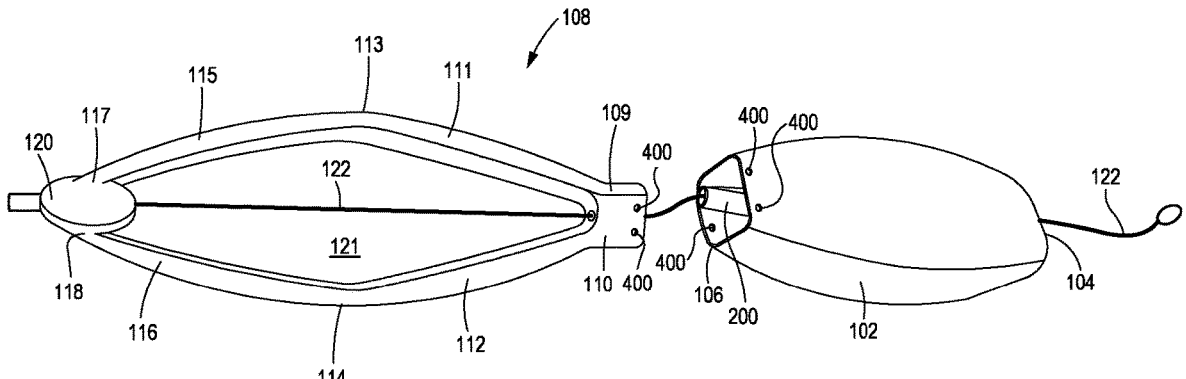
FIG. 10 is a perspective view of a line-thru fishing lure with the body and legs partially disassembled, according to an embodiment of the present disclosure.

As shown in FIG. 10, the body 102 and the pair of legs 108 may connect and fit together as male and female counterparts, as generally known in the arts. The pair of legs 108 may be further secured to the body 102 at the tail 106 with bait keepers such as barbed wire, spring bait keepers, toothpicks, and male & female connectors, or the like, as generally known in the arts. Bait keepers, screws, toothpicks, male & female parts, nuts & bolts, or the like may be use to connect the body 102 and the pair of legs 108 in a set of connecting slots 400. Adhesives may also be utilized to secure the body 102 and the pair of legs 108. A portion of the first channel 200 may extend inside the pair of the legs 108 when the lure 100 is assembled. The lure 100 may float on top of water because the lure 100 is hollow.

Figure 11:
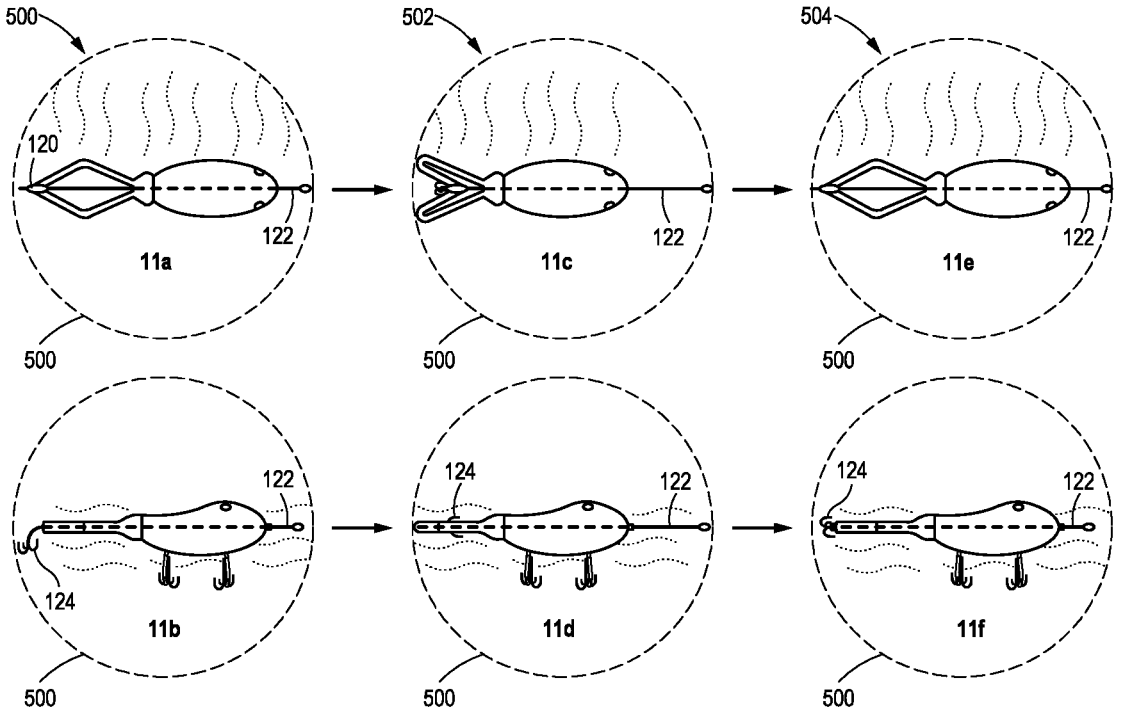
FIG. 11 is a schematic of the fishing lure of FIG. 2 with the legs moving and the lure remaining in place using a tug & release pull technique of the lure line, according to an embodiment of the present disclosure.
Figure 12:
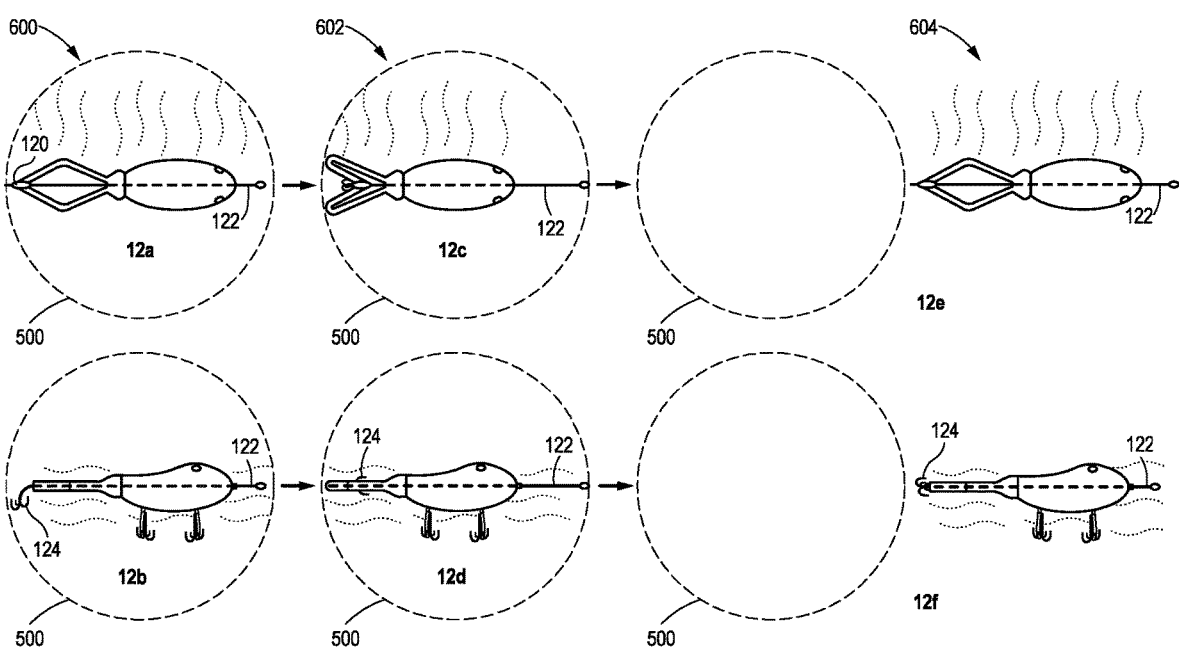
FIG. 12 is a schematic of the fishing lure of FIG. 2 moving across water after a tug & hold pull technique of the lure line, according to an embodiment of the present disclosure.

Now referring to FIGS. 11-12, two fishing techniques of the lure 100 are illustrated using the lure 100 to mimic a frog's movement on top of water. FIG. 11, illustrates a tug & release (TR) pull technique, in one embodiment of the disclosure. FIG. 12 illustrates a tug & hold (TH) pull technique, in another embodiment of the disclosure. Both the TR and TH fishing techniques create natural-like movements that entices a fish to bite the lure 100 and get hooked. The lure 100 may utilize the TR & TH fishing techniques to create disturbances and stillness on the surface of water resembling the natural movements of a real frog.

In FIG. 11, the lure 100 is illustrated, in one embodiment, using the TR technique to move the pair of legs 108 while keeping the lure remaining in an area 500 when the line 122 is loaded and unloaded. In FIGS. 11a and 11b, the lure 100 is provided in a first TR position 502 whereby the pair of legs 108 are fully extended in an unloaded state. In a second TR position 504, shown in FIGS. 11c and 11d, the line 122 is tugged causing the foot body 120 to move towards the tail 106 thereby bending the pair of legs 108. The pair of legs 108 are placed in a loaded state so that when the line 122 is released or untugged, the pair of legs 108 will revert to the unloaded position with the first leg 109 and second leg 110 extended and the lure 100 will remain in the area 500, as shown in FIGS. 11e and 11f, in a third TR position 506. The pair of legs 108 may repeatedly be placed in a loaded and unloaded state, while keeping the lure 100 floating, suspended in water, or while sinking, in the area 500. When the lure 100 is used with the TR fishing technique, the pair of legs 108 mimics bait let movement and entices a fish to bite the lure 100 to get hooked to the hook 124 or belly hook 202 while floating, suspended in water, or while sinking, in the same general area of a fish bed. This allows a fisherman to keep the lure 100 in the area 500 without having to continuously recast the lure 100 onto the water.

In FIG. 12, the lure 100 is illustrated, in another embodiment, using the TH fishing technique as it moves across the water when the line 122 is loaded and unloaded, with a top and side view, simultaneously. In FIGS. 12a and 12b, the lure 100 is provided in a first TH position 600 whereby the pair of legs 108 are fully extended in an unloaded state. In a second TH position 602, shown in FIGS. 12c and 12d, the line 122 is pulled or tugged into a loaded state, causing the foot body 120 to move towards the tail 106, thereby bending the pair of legs 108. When in a loaded state, the pair of legs 108 will pull on the line 122 causing tension to facilitate movement of the lure 100, as the primary movement. When the line 122 is released or untugged, the pair of legs 108 will revert to the unloaded state with the first leg 109 and second leg 110 extended in its neutral original position, as shown in FIGS. 12e and 12f. When the pair of legs 108 pull against the line 122 to cause the lure 100 to jump across the water and move away from the area 500, as shown in a third TH position 604 in FIGS. 12e and 12f.

As a secondary movement, the pair of legs 108 may also exerts a force against the water further causing the lure 100 to move or jump across the water to the third position 404 away from the area 500, as a secondary movement. When the lure 100 moves across the water it mimics bait and entices a fish to bite the lure 100 to get hooked to the hook 124 or belly hook 202.

The lure 100 uses elastic energy to move across a distance after the line 122 has been pulled, as shown moving from second TH position 602, depicted by FIGS. 12c and 12d, to the third TH position 604 depicted by FIGS. 12e and 12f. The pair of legs 108 use elastic energy to pull against the line 122 and against the water in the area 500 to move the lure 100 a distance across water and out of the area 500. The elastic energy released when the line 122 is released may cause the lure 100 to jump like a frog to get to the third TH position 604. The pair of legs 108 may be made up of shape-memory polymers that can return to an unloaded state from a loaded state, such as when the pair of legs 108 are bent as the foot body 120 moves toward the tail 106. The shape-memory polymer may allow the creation and release of elastic energy to move the lure 100 forward when the line 122 is pulled and released and the pair of legs 108 are bent and extended from a loaded and unloaded state, repeatedly.

As the secondary causation of movement, the pair of legs 108 exert a force against the water body when going from the loaded state to the unloaded state, causing the lure 100 to move or jump across the water mimicking a frog, insect, amphibian, or other bait moving.

It may be recognized that the TH fishing technique is a full range of movement of the lure 100 and the TR fishing technique is the lowest range of movement of the lure 100. It may also be recognized that a user of the lure 100 may utilize a fishing technique of the lure 100 that falls between the range of the TR & TH fishing techniques for a desired movement by the user, as different species of fish may be enticed differently by the amount of mimic movement of the lure 100.

It may be recognized that a spring or other biasing member may be placed on the line 122 between the pair of legs 108 or in the space 121 to facilitate and/or assist movement of the lure 100 from a loaded to an unloaded state.

Certain species of fish will be tricked into believing that the lure 100 is a frog, insect, amphibian, or other bait for fish food when the lure 100 mimics a bait's hind leg movement when the line 122 is tugged or pulled. The lure 100 will attract a fish to bite the lure 100 at either the foot body 120 or body 102 when the lure 100 is mimicking a bait moving across water, thereby hooking the fish to the hook 124 or belly hook 202.

The lure 100 may be considered a "line-thru" lure whereby the body 102 may move along the line 122. In other words, the body 102 and the pair of legs 108 that resemble a frog or other bait may slide across the line 122. This can provide easier access for the fisherman to remove the hook 124 from the mouth of a fish that has been hooked to the lure 100. Additional portions of the line 122 may be provided through the lure 100 so that the hook 124 moves away from the body 102 and the pair of legs 108. It is recognized that the line 122 may be of any length, as required.

The lure 100 may be further connected to a fishing pole (not shown), as generally known in the arts. The free end of the line 122 is proximate to the head 104 may connect to a fishing line (not shown) of a fishing pole, as generally known in the arts. The line 122 may be tugged or pulled by the fishing pole to mimic a frog, grasshopper, insect, amphibian, or other bait having hind legs moving across water.

Figure 14:
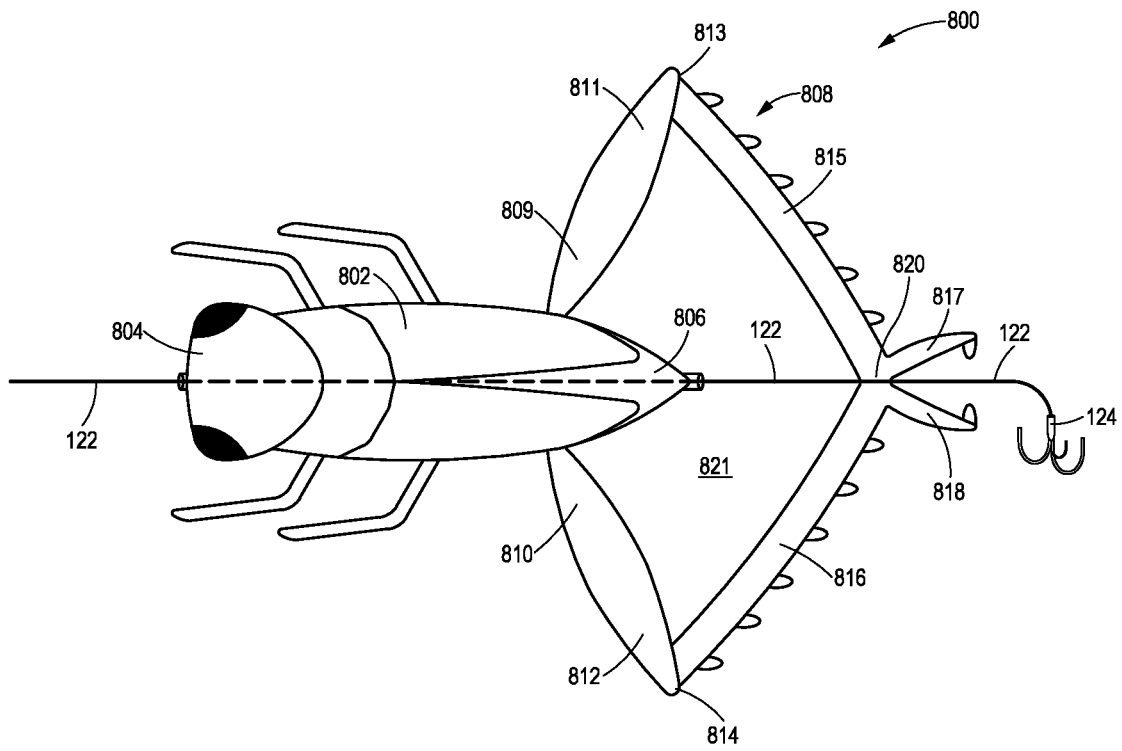
FIG. 14 is a top plan view of a line-thru lure resembling a grasshopper, according to an embodiment. The figures depict one embodiment of the presented invention for purposes of illustration only. One skilled in the art will readily recognize from the following discussion that alternative embodiments of the structures and methods illustrated herein may be employed without departing from the principles described herein.

Now referring to FIG. 14, a grasshopper lure 800 is illustrated in another embodiment of the present disclosure as a line-thru lure resembling a grasshopper. The grasshopper lure 800 comprises a grasshopper body 802, with the grasshopper body 102 having a grasshopper head 804 and a grasshopper tail 806. The grasshopper tail 806 is connected to a pair of grasshopper legs 808 that extends proximate the grasshopper tail 806. The pair of grasshopper legs 808 may resemble a pair of hind legs as generally known on the anatomy of grasshoppers, insects, or other amphibians and are used to resemble fish bait.

The pair of grasshopper legs 108 comprises a first leg 809 and a second leg 810. The first leg 809 has a first grasshopper thigh 811, a first grasshopper knee 813, a first grasshopper shin 815, and a first grasshopper foot 817. The second leg 810 has a second grasshopper thigh 812, a second grasshopper knee 814, a second grasshopper shin 816, and a second grasshopper foot 818. The first grasshopper leg 809 is bent at the first grasshopper knee 813. The second grasshopper leg 810 is also bent at the second grasshopper knee 814 in an opposite direction of the first grasshopper leg 809. The first grasshopper foot 817 connects to the second grasshopper foot 818 reconnecting the first grasshopper leg 809 to the second grasshopper leg 810 forming a grasshopper foot body 820. The first grasshopper leg 809 and the second grasshopper leg 810 form a grasshopper space 821 between the first grasshopper knee 813 and the second grasshopper knee 814. As opposed to known grasshopper lures, the line 122 is extended through the grasshopper head 804 of the grasshopper body 802 through the grasshopper tail 806 and between the pair of grasshopper legs 108. More specifically, the line 122 also extends through the grasshopper space 821 between the first grasshopper knee 813 and second grasshopper knee 814, through the foot grasshopper body 820, and ultimately connected to the hook 124. The grasshopper lure 800 may also have the belly hook 202 on an underside of the grasshopper body 802. The grasshopper lure 800 is also capable of performing the TR technique and the TH technique, as described above.

INDUSTRIAL APPLICABILITY

In operation, the present disclosure may find applicability in many industries including, but not limited to, the fishing and hunting industries. Specifically, the technology of the present disclosure may be used to catch fish with a line-thru lure resembling a frog, but not limited to, fishing lures resembling frogs, insects, and the like. While the foregoing detailed description is made with specific reference to fishing frog lure baits, it is to be understood that its teachings may also be applied onto other baits for fishing and hunting such as insects, amphibians, and the like.

Now referring to FIG. 13, a method 700 of catching fish using the line-thru lure 100 of the present disclosure is depicted. First, in a step 702, the lure 100 resembling wildlife or fish bait such as a frog or insect, or amphibian is provided. The lure 100 is provided comprising the body 102, the pair of legs 108 extending from the body 102 and being connected at mutual ends thereof forming the foot body 120. The lure 100 is made of material configured with varying degrees of buoyancy to allow the lure 100 to float, suspend in water, or sink in the body of water. The pair of legs 108 are made of shape-memory material configured to revert the pair of legs 108 to an original or extended position.

In a step 704, the line 122 is extended through the body 102, through the pair of legs 108 and to the foot body 120. The line 122 goes entirely though the lure 100. The line 122 is provided through the body 102 and to the foot body 120 so that the pull point of the lure 100 is located at the foot body 120, when initially tugged or pulled.

In a step 706, the hook 124 or belly hook 202 is connected to the lure 100. The hook 124 may be connected to the line 122 at an end extended through the foot body 120. The belly hook 202 may be provided on an underside of the body 102. The hook 124 and the belly hook 202 may be connected at positions on the lure 100 corresponding to the portions of wildlife anatomy that a fish would be enticed to bite, such as the feet or belly of a frog, amphibian, or insect.

The hook 124 is connected to the line 122 directly, with wire, assist line, PE assist line, fluorocarbon line, monofilament line, or as generally known in the arts. The hook 124 is also configured to fit into the second channel 300. This allows the hook 124 to hide and dislodge to and from the second channel 300 when the line 122 is tugged and untugged. The lure 100 allows the hook 124 to be separated from the lure 100 when a fish is hooked on to give the fish less of a chance of becoming unhooked.

The belly hook 202 may also be connected to the body 102 directly, with fluorocarbon fishing line, monofilament line, braid line, wire, metal wire, assist line, PE assist line, or as generally known in the arts. PE assist line keeps enough stiffness in the line to avoid tangling but is limber enough for movement when a fish is hooked. Generally, assist lines are cords used for hooks in fishing and help avoid tangles. Assist cords are generally made of up fibers that cause the line 122 to not loose strength upon exposure to ultraviolet light. PE assist line may be hollow which allows a user to splice a loop when using a needle. The line 122 may also be various colors for reducing visibility to fish such as blue. Titanium wire or metal wire may be threaded in the PE assist line. The metal wire may be provided wholly or partially the full length of the PE assist line. The line 122 through the pair of legs 108 and in the space 121 helps prevent tangling as thin or less stiff lines can create excess slack which increases undesirable tangling situations of the line 122. Providing a metal wire, partially, allows for only part of the line 122 to be stiff and prevent tangles. Having a partially stiff line allows for enough movement of the line 122 for an increased chance of hooking a fish during a bite. The line 122 provided between the pair of legs 108 is also advantageous for skip casting because tangling is more advantageously prevented. Skip casting generally requires lures to be able to slide well across a surface. The lure 100 allows a user to prevent unnecessary tangling while sliding across a surface and avoid any delay and lost opportunity to catch fish.

In a step 708, the lure 100 is cast onto a body of water for catching fish. The lure 100 may be cast onto a body of water as generally known in the art of fishing, such as using a fishing pole, or the like. The lure 100 may be in a first TR position 502, or first TH position 600, as shown in FIGS. 11*a*, 12*a*, 11*b*, and 12*b*. The lure 100 is made of material configured with varying degrees of buoyancy to allow the lure 100 to operate the TR technique and TH technique while floating, suspend in water, or while sinking.

In a step 710, the line 122 is pulled or loaded, thereby pulling the foot body 120 towards the tail 106 and bending the pair of legs 108 into a loaded state. Pulling the line 122 causes the distal end of the lure 100 to bend the pair of legs 108 into a loaded state and move the foot body 120 towards the body 102, as shown in FIGS. 11*c*, 12*c*, 11*d*, and 12*d* in a second TR position 504 or a second TH position 602. When the line 122 is pulled in step 710, the hook 124 contacts the foot body 120, thereby causing the foot body 120 to move towards the tail 106.

In a step 712, the line 122 is released or unloaded, whereby the pair of legs 108 are unloaded in a TR Technique. The pair of legs 108 are unloaded but the lure 100 remains in the area 500, as shown in FIGS. 11*d* and 11*e*, in the third TR position 506. Alternatively, in a step 714, the fisherman may use the TH technique to hold the line 122 to increase the load on the pair of legs 108 and subsequently release the line 122 to cause the lure 100 to move forward. The release of the loaded state causes the pair of legs 108 to pull against the line 122 and also exert a force against the body of water in the area 500. This causes the lure 100 to move or jump across the water away from the area 500, mimicking wildlife moving, such as a frog jumping across water, as shown in FIGS. 12*d* and 12*e*, in the third TH position 604. When the line 122 is released in the TH technique, the pair of legs 108 extend out and revert to an unloaded state as the hook 124 and the foot body 120 releases the pair of legs 108 thereby pushing body 102 forward and out of the area 500.

A fisherman may repeatedly tug and untug, pull and release, or load and unload the line 122 to cause the lure 100 to mimic bait that entices fish to bite. The fisherman may utilize the TH and TR techniques, or a range between the TH and TR techniques, so that it causes the lure 100 to mimic bait to entice a fish to bite. The lure 100 may resemble a frog, insect, reptile, or other amphibian that will entice a fish to bite when the lure 100 mimics, moves, and/or jumps across water like a frog, insect, or amphibian that has hind legs. When the fish bites the lure 100, after being enticed by movement of the foot body 120, the fish will become hooked to the hook 124 or the belly hook 202.

From the foregoing, it can be seen that the technology disclosed herein has industrial applicability in a variety of settings such as, but not limited to fishing and hunting industries that utilize bait such as a frog, insect, amphibian, or other bait resembling animals with hind legs.

What is claimed is:

1. A lure comprising:

a head, a tail, a first channel extending inside the head to the tail, a pair of hind legs extending from the tail and including a first leg having a first knee and a first foot, a second leg having a second knee and a second foot, the first leg and the second leg form a space between the first knee and the second knee, and the first foot being connected to the second foot forming a foot body having a second channel;

wherein the lure is configured to receive a line having a first end and a second end, the second end extending through the first channel, through the space, and into the second channel and through the foot body, the second end being connected to a hook;

wherein the pair of hind legs are made of a material that allows the hind legs to bend and then revert to an extended shape, such that the legs use elastic energy to pull the line against the water to move the lure; and wherein:

pulling the first end of the line causes the pair of hind legs to be in a loaded state, wherein the hook moves to the foot body, the first and second legs bend at the first and second knees respectively, and the foot body is pulled towards the tail; and releasing the line causes the pair of hind legs to be in an unloaded state, wherein the first and second legs revert to the extended shape, and the foot body moves away from the tail.

2. The lure of claim 1, wherein the lure is provided resembling a bait chosen from the group consisting of a frog, an insect, a grasshopper, a bird, a mammal, a reptile, and an amphibian, and a portion of the line resembles a tongue of the bait.

3. The lure of claim 1, further comprising the line and the hook, wherein the line is made of a material chosen from the group consisting of nylon rope, PE assist line, assist line, monofilament line, fluorocarbon line, and PE assist line integrated with metal wire.

4. The lure of claim 2, wherein the lure has varying degrees of buoyancy.

5. The lure of claim 2, the lure is made of material chosen from the group consisting of shape-memory polymer, thermoplastic elastomer, plastic, plastisol, resin, and rubber.

6. The lure of claim 2, the first channel and the second channel are tubes made of material chosen from the group consisting of metal, aluminum, and plastic.

7. The lure of claim 1, further comprising at least one second hook attached between the head and the tail, wherein the at least one second hook is connected to the lure by a cord.

8. The lure of claim 7, wherein the cord attaching the at least one second hook to the lure is made of a material chosen from the group consisting of nylon rope, PE assist line, assist line, monofilament line, fluorocarbon line, and PE assist line integrated with metal wire.

9. The lure of claim 8, the hook and the at least one second hook each being one chosen from the group consisting of a j-hook, a single hook, a double hook, a treble hook, and an assist hook; the hook is further secured to the lure with shrink wrap applied around a first shank portion of the hook and the line, and the at least one second hook is further secured to the lure with shrink wrap applied around a second shank portion of the at least one second hook and the cord.

10. The lure of claim 1, wherein the pair of hind legs are insertable into the tail and secured by a fastener extending through a connecting slot on the pair of hind legs and the tail.

11. The lure of claim 1, wherein the second channel is configured to receive the hook when the line is pulled.

12. A line-thru lure comprising:

a head, a tail, a hook, a first channel extending inside the head to the tail, and a pair of hind legs extending from the tail, a first leg having a first knee and a first foot, a second leg having a second knee and a second foot, the first leg and the second leg form a space between the first knee and the second knee, and the first foot being connected to the second foot forming a foot body having a second channel;

a line having a first end and a second end, the second end is provided through the first channel, through the space, and into the second channel and through the foot body, the second end is connected to the hook; and at least one second hook attached between the head and the tail via a cord wherein the pair of hind legs are made of a material that allows the hind legs to bend and then revert to an extended shape, such that the legs use elastic energy to pull the line against the water to move the lure; and wherein:

pulling the first end of the line causes the pair of hind legs to be in a loaded state, wherein the hook moves to the foot body, the first and second legs bend at the first and second knees respectively, and the foot body is pulled towards the tail; and releasing the line causes the pair of hind legs to be in an unloaded state, wherein the first and second legs revert to the extended shape, and the foot body moves away from the tail.

13. The line-thru lure of claim 12, wherein the line-thru lure resembles one bait chosen from the group consisting of a frog, a grasshopper, a mammal, a bird, an insect, a reptile, and an amphibian, and a portion of the line proximate to the head resembles a bait tongue movable in and out of the head.

14. The line-thru lure of claim 13, the line-thru lure includes a shrink wrap further securing the at least one second hook to the cord, the at least one second hook is one chosen from the group consisting of a j-hook, a single hook, a double hook, a treble hook, and an assist hook.

15. The line-thru lure of claim 12, the line-thru lure is made of material chosen from the group consisting of elastic polymer, rubber, plastisol, resin, and shape-memory polymer, wherein the line-thru lure has varying degrees of buoyancy.

16. The line-thru lure of claim 12, the first channel and the second channel are tubes made of material chosen from the group consisting of metal, aluminum, and plastic.

17. The lure of claim 12, wherein the pair of hind legs are insertable into the tail and secured by a fastener extending through a connecting slot on the pair of hind legs and the tail.

18. The lure of claim 12, wherein the hook is configured to enter the second channel in the foot body when the line is pulled.

19. A method of catching a fish comprising:

providing the lure of claim 1;

extending the first end of the line through the body, through the pair of hind legs, through the space, and through the foot body;

connecting the first end of the line to the hook;

casting the lure on a body of water expected to have fish;

pulling the line to cause the hook to load the pair of hind legs, the hook hides within the second channel in the foot body when the line is pulled; and releasing the line causing the pair of hind legs to unload while the lure remains essentially in place.

20. The method of claim 19, the method further comprising:

holding the line to increase the load on the pair of hind legs; and releasing the line causing the lure to move forward.

* * * * *